United States Patent [19]

Quaglino

[11] Patent Number: 4,797,860
[45] Date of Patent: Jan. 10, 1989

[54] METHOD FOR SHOT POINT ANALYSIS OF SEISMIC REFLECTION SIGNALS

[75] Inventor: Carl A. Quaglino, Dallas, Tex.

[73] Assignee: Mobil Oil Corporation, New York, N.Y.

[21] Appl. No.: 125,903

[22] Filed: Nov. 27, 1987

[51] Int. Cl.[4] .......................... G01V 1/36; G01V 1/28
[52] U.S. Cl. ......................................... 367/47; 367/30; 367/13; 364/421
[58] Field of Search ........................ 367/21, 29, 30, 47, 367/68; 364/421

[56] References Cited

U.S. PATENT DOCUMENTS

| | | | |
|---|---|---|---|
| 3,506,085 | 4/1970 | Loper | 181/0.5 |
| 4,134,098 | 1/1979 | Ruehle | 340/7 R |
| 4,357,689 | 11/1982 | Ruehle | 367/23 |
| 4,397,007 | 8/1983 | Goode et al. | 367/68 |
| 4,405,999 | 9/1983 | Zachariadis | 367/23 |
| 4,453,219 | 6/1984 | Clavier et al. | 367/25 |
| 4,628,492 | 12/1986 | Winney | 367/63 |
| 4,636,993 | 1/1987 | Lumby et al. | 367/47 |

OTHER PUBLICATIONS

R. E. Sheriff, "Encyclopedic Dictionary of Exploration Geophysics", 1973, p. 224, S&G, Tulsa, Ok.

Primary Examiner—Nelson Moskowitz
Attorney, Agent, or Firm—Alexander J. McKillop; Michael G. Gilman; George W. Hager, Jr.

[57] ABSTRACT

A seismic marine survey is carried out by traversing a line of exploration with an acoustic energy source, an array of spaced-apart receivers, and a recording system. A plurality of receivers along the receiver array are selected and the maximum amplitude wavelets of the seismic reflection signals recorded from such receivers are compared to identify any trend in a select seismic survey parameter.

9 Claims, 9 Drawing Sheets

METHOD FOR SHOT POINT ANALYSIS OF SEISMIC REFLECTION SIGNALS

RELATED APPLICATION

This application is related to U.S. Pat application Ser. No. 125,902 (Atty. Docket No. 4539) filed simultaneously with this application.

BACKGROUND OF THE INVENTION

This invention relates to seismic exploration for oil and gas, and more particularly to a method for processing and displaying seismic data obtained along a seismic line of exploration.

In seismic exploration, acoustic energy is imparted into the earth at a plurality of acoustic energy generating positions (i.e. shot points) along a desired line of exploration. Such acoustic energy is reflected at interfaces between rock layers of varying acoustic impedance. Its return to the surface of the earth can be detected by seismic receivers, commonly referred to as geophones when used in land exploration and as hydrophones when used in marine exploration. The recorded output of such a seismic receiver is referred to as a seismic trace. When the trace is recorded in analog form on a magnetic tape, there is a continuous record written on the tape of an output voltage of a seismic amplifier used in conjunction with the recording of the electrical signals generated by the seismic receivers. When processed in analog form, these electrical signals are operated upon, for example, by filtering, to present them in form for use by geophysicists. With the advent of digital recording of seismic data, a discontinuous record of the signal is written that measures the seismic amplifier output voltage only at discrete intervals. The digitally recorded data may be operated upon to present the data in form for use by geophysicists. The recording of the seismic energy is commonly displayed as a seismogram having a plurality of traces printed side by side thereon and having a means superimposed thereon for timing the recorded events. The recorded event of energy reflected from a reflecting interface, hereafter referred to as from a subsurface formation, is a relatively high amplitude wavelet peak, commonly referred to as a reflection. If the plurality of traces are corrected for the differing source-to-receiver distance, the reflection peaks from a common subsurface interface will line up across the seismogram.

It is also well known that as seismic detectors become displaced further and further from the shot points for the source of seismic energy, the relative amplitudes of the seismic reflections drop off due to divergence of the generally spherical wave front as it travels through the subsurface formation. It is known to apply automatic gain control (AGC) to the weaker reflections of a given trace so that the average amplitude of the trace is more close to constant, so as to enable more efficient analysis of the seismogram.

SUMMARY OF THE INVENTION

The present invention is directed to a method for processing seismic reflection signals obtained during a seismic exploration survey in which seismic acoustic energy is transmitted into a subsurface formation, reflected from subsurface interfaces, and recorded by receivers located at spaced-apart positions along a line of exploration.

In one aspect of the invention the seismic reflection signal received by at least one of the receivers is recorded for each of the seismic energy shot points. A common wavelet in the recorded seismic signal is selected for each of the shot points. The amplitude of the common wavelet is measured over the plurality of shot points. These measured amplitudes are compared to identify any trend in an actual value of one of the seismic survey parameters. This comparison is carried out in one embodiment of the invention by generating a composite plot of amplitude versus shot point location for the measured amplitudes over the plurality of shot points.

In another aspect of the invention, a plurality of at least three of the recorded seismic signals are selected for processing. Preferably these recorded signals comprise the reflection signals from the recording positions representing the nearest and the farthest receiver positions from an acoustic energy shot point as well as at least one intermediate receiver position between the nearest and farthest positions. Alternatively, the at least three recorded signals comprise a first reflection signal from a receiver in a first grouping of receivers nearest the acoustic energy shot point, a second reflection signal from a receiver in a second grouping of receivers farthest from the acoustic energy shot point, and a third reflection signal from a receiver in a third grouping of receivers between such first and second groupings of receivers.

After selection of the seismic reflection signals to be processed, a common wavelet in each of the signals is identified exhibiting a maximum amplitude. These slected wavelets are then compared to detect any trend in a select seismic survey parameter along the line of exploration. This comparison is carried out in one embodiment of the invention by generating a composite plot of amplitude versus time of the selected wavelets with the amplitude axis determined by the maximum peak amplitude of the selected wavelets. In a further embodiment, the amplitudes of the selected wavelets are plotted logarithmically to enhance the comparison.

After identifying any trend in a select seismic survey parameter, such trend may be adjusted or corrected to bring the actual value of the survey parameter back in line with a desired, or required, value for such survey parameter. Confirmation of the effects of such adjustment can be made by repeating the method of the present invention either in real-time during a survey operation or in later playback for designing a future survey operation.

DESCRIPTION OF THE PREFFERRED EMBODIMENT

Before describing the method of the present invention relating to the processing of seismic reflection signals, a conventional seismic data acquisition system which may be used in the generating and gathering of seismic reflection signals in accordance with the present invention will first be described.

Figure 1:
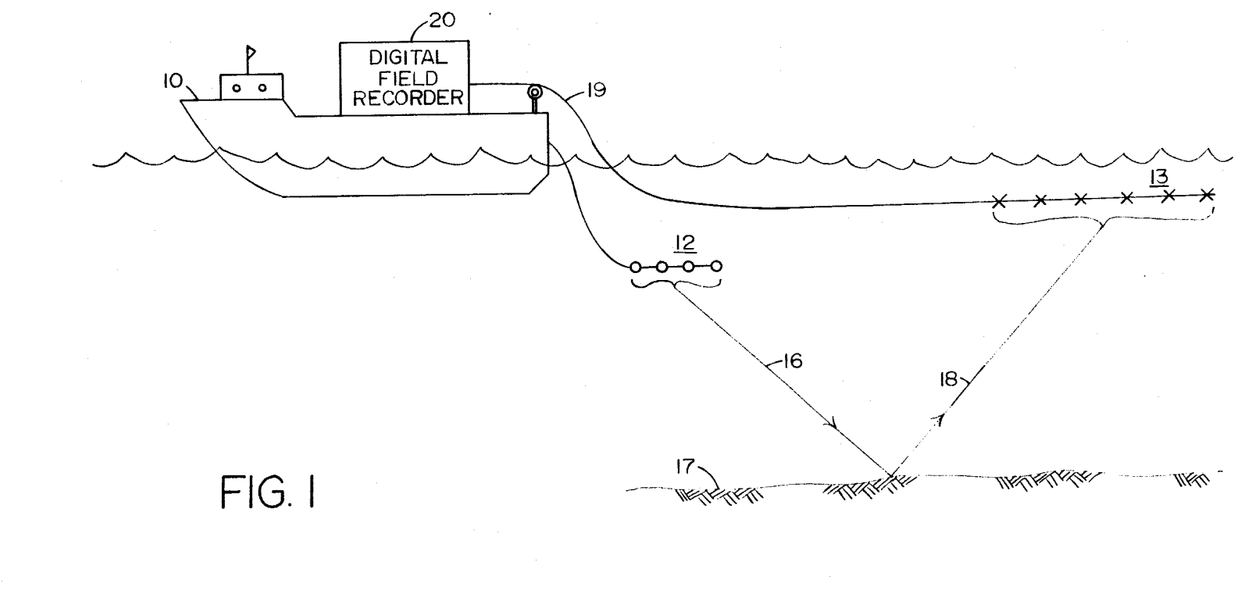
FIG. 1 illustrates a seismic exploration system useful in carrying out the method of the present invention.

While the method of the present invention may be carried out by either a land seismic exploration system or a marine seismic exploration system, FIG. 1 illustrates one marine seismic exploration system which has been successfully used in carrying out the invention. Referring briefly to FIG. 1, a vessel 10 traverses a seismic exploration line in surveying the subsurface formation beneath a water layer. An array of acoustic energy sources 12 is towed behind vessel 10. Also towed behind vessel 10 at a greater distance from the array 12 is an array 13 of acoustic receivers, or hydrophones. As the vessel 10 traverses a line of exploration, the source array is repetitively fired at a plurality of shot points to produce seismic pressure waves in the water layer. Each of the sources in the array 12 may be fired sequentially at each shot point to direct a pressure wave through the water by way of path 16 to subsurface interface 17 where it is reflected by way of path 18. As the acoustic pressure wave approaches the horizontal receiver array 13 by way of path 18 it is detected by each of the hydrophones in the array. Each hydrophone generates an electrical signal in response to receipt of the acoustic pressure wave. These hydrophone signals are connected by way of cable 19 to a digital field recorder 20 on board vessel 10 where they are recorded as side-by-side traces on a seismogram. A typical seismic source which is used in marine exploration is shown in U.S. Pat. No. 3,506,085 to George B. Loper. A linear array of sources suitable for use in marine exploration is described in U.S. Pat. No. 4,134,098 to William H. Ruehle A typical field recording system is the Texas Instruments Model DFSV Digital Field Recorder. For more details as to the operation of such a marine seismic exploration system, reference may be made to U.S. Pat. No. 4,357,689 to William H. Ruehle, the teaching of which is incorporated herein by reference.

Having now briefly described the operation of a typical marine seismic exploration system for the generating and gathering of seismic reflection signals along a line of exploration, the method of processing seismic reflection signals in accordance with the present invention will now be described The invention was developed for the purpose of analyzing recorded seismic reflection signals for each shot point of seismic acoustic energy for amplitude effects created by various system parameters, such as acoustic energy source configuration and level, receiver array configuration and sensitivity, background level, noise level, instrument gain, cycle rate, etc. One of the purposes of this shot point analysis is to permit an operator to make interactive adjustments to the seismic exploration system parameters during a real time survey. Further, there is a benefit to making a post-survey analysis for the development of future survey parameters or for input to further data processing operations.

Figure 2:
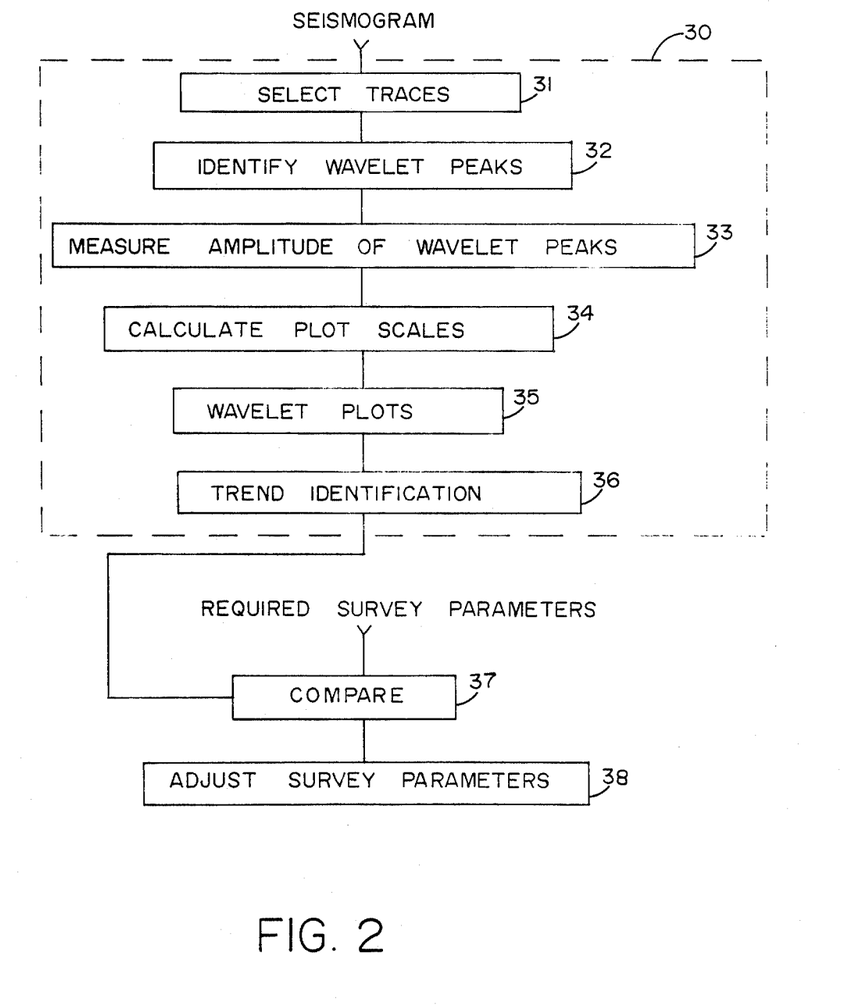
FIGS 2 and 3 are flow chartsdepicting the steps involved in processing seismic data as might be recorded by the seismic exploration system of FIG. 1.
Figure 4:
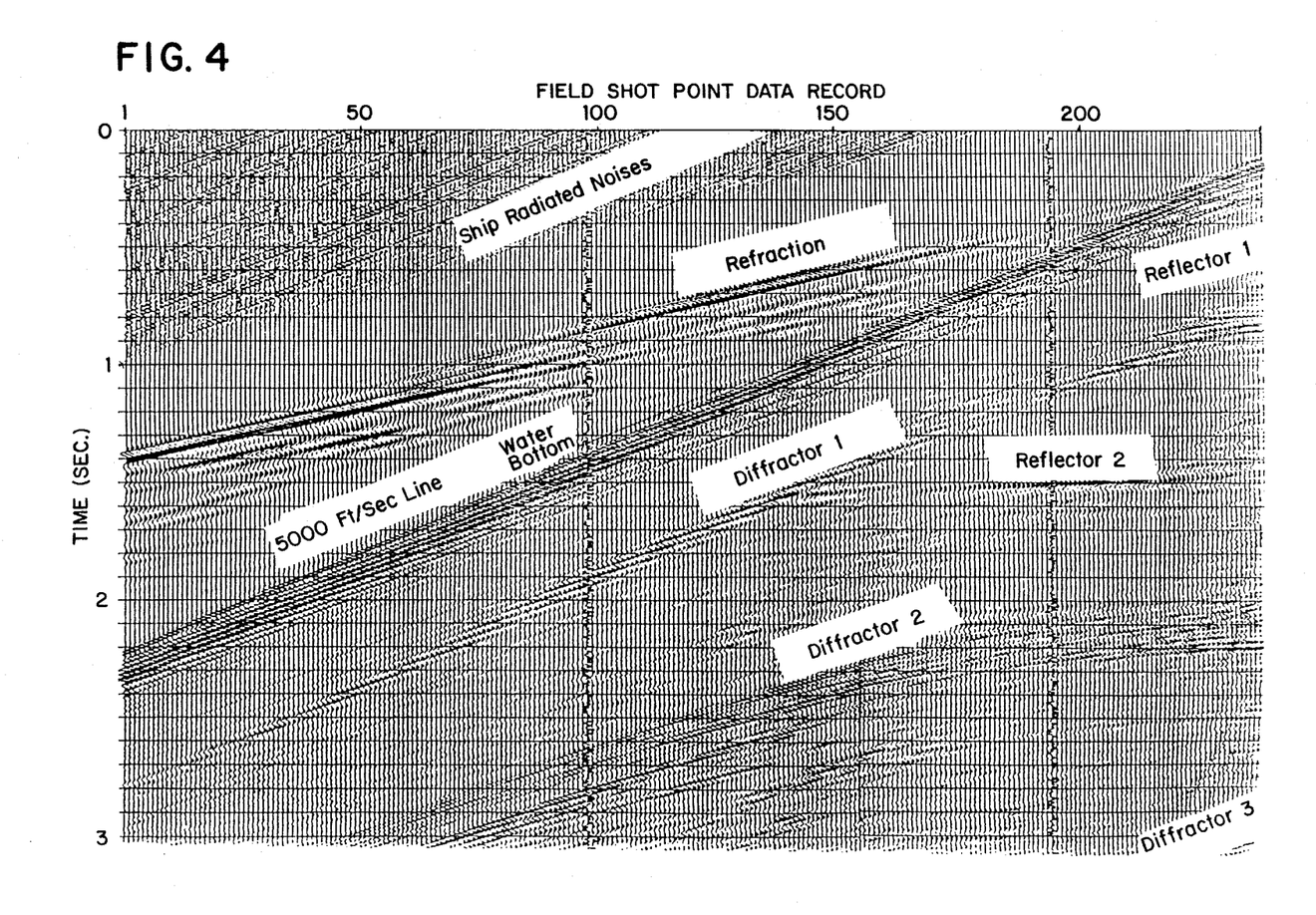
FIG. 4 represents a seismogram of seismic traces as might be recorded by the seismic exploration system of FIG.1

Referring now to FIG. 2, there is shown a flow chart of the steps to be carried out in the present invention. Seismic traces recorded during one marine seismic exploration survey, and as illustrated in the seismogram of FIG. 4 are input, during either real-time survey operations or during post-survey processing to the shot point analysis process 30. Individual or multiple traces may be selected at step 31. Trace selection is dependent upon which system parameter effects on the reflection signals are to be observed, or determined, and adjustments made to such system parameters, either in real-time or in future surveys. For example, those traces that best reflect the effects of source gun pressure may be selected when it is desired to reduce distortion of shallow reflectors at the expense of the signal-to-noise ratio of deep reflectors. After trace selection, the wavelet on each trace having a maximum positive or negative peak amplitude is identified at step 32. It might be preferred to pick the peak negative amplitudes written on field tape if the initial arrivals are an increase in pressure which corresponds to a downward camera or galvonometer deflection and negative numbers on tape. Whether positive or negative, all maximum wavelet amplitudes will hereinafter be referred to as wavelet peaks.

These amplitudes are then measured at step 33. Such measurements could be of a unitless number or converted to a pressure unit such as microbars. Conversion to pressure units would be a preferred means of quantifying the data.

At the next step 34, the scales for plotting the identified wavelet peaks are determined. The amplitude Y-axis plot scale is based on the maximum recordable signal levels as defined by the recording system parameters and receiver sensitivity. The time X-axis plot scale is determined by the recorded trace length or interval between acoustic energy shot points along the line of exploration. The log base 10 units are chosen as a means of permitting determination of the range of signals from the maximum to the minimum level on a single plot, that is, a range of 100,000 microbars to 1 microbar can be compressed such that all signals within the range can be contained on a single plot. Other units such as log base e could have been chosen for either plot axis dependent upon the desired display characteristics.

Figure 5:
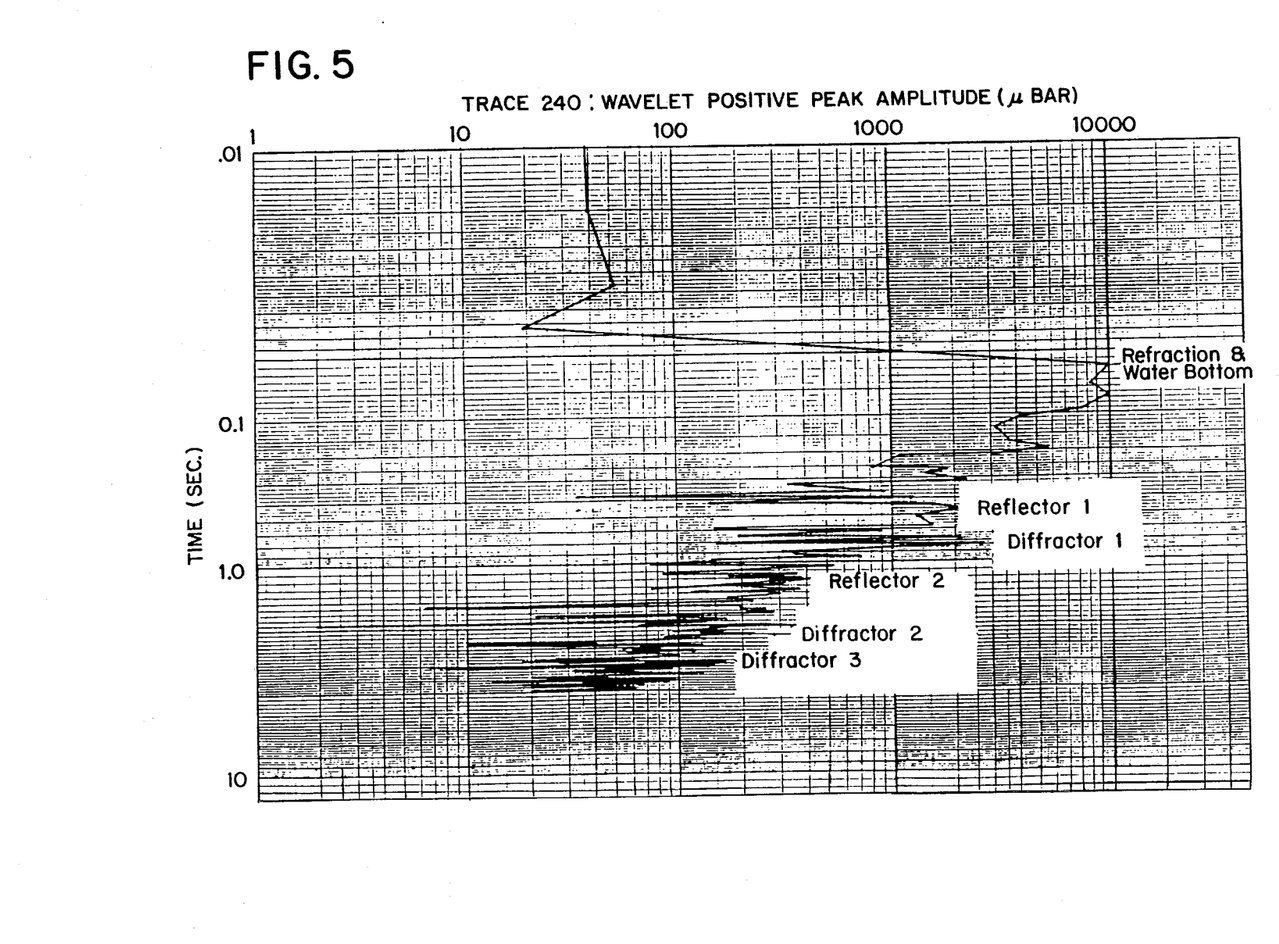
FIGS. 5-9 illustrate wavelet plots of select seismic traces determined in accordance with method of the present invention from select seismic traces of the seismogram of FIG. 4.
Figure 6:
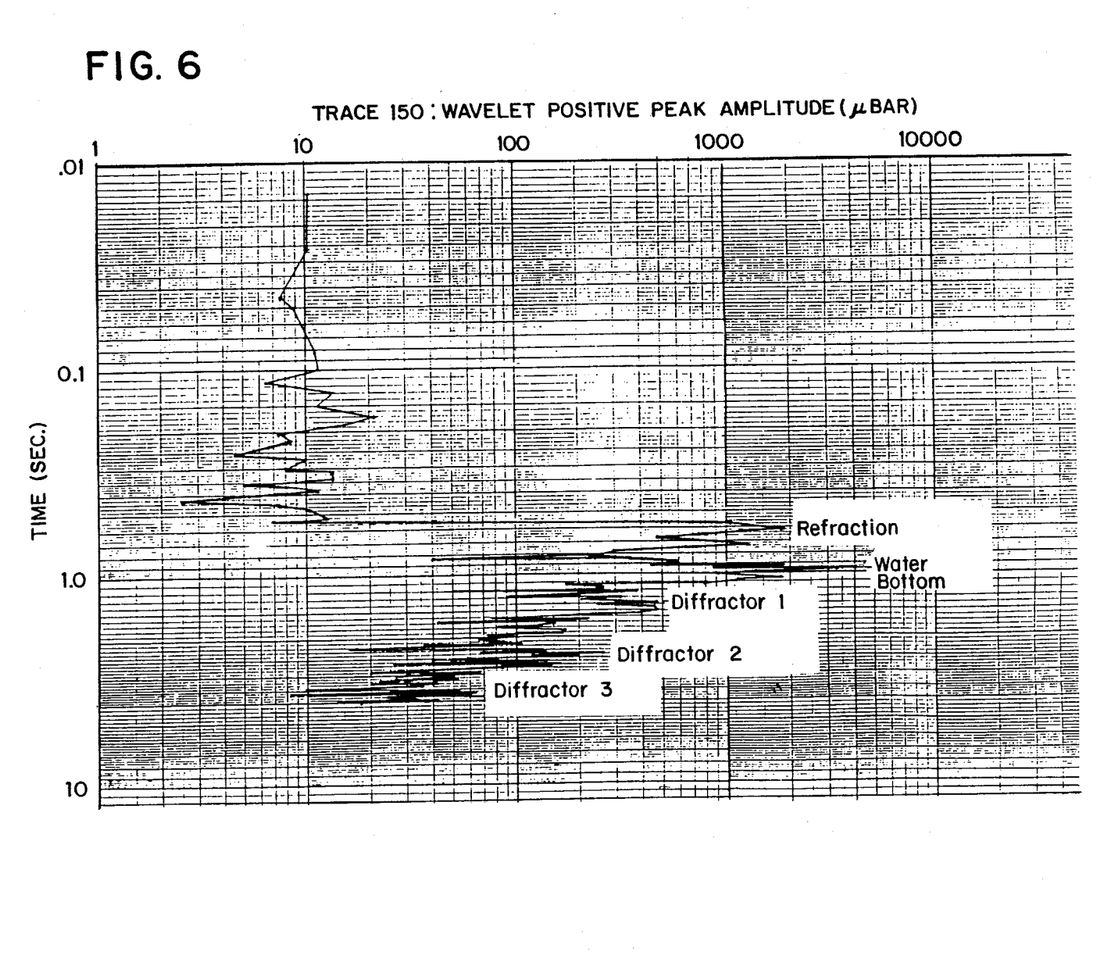
Figure 7:
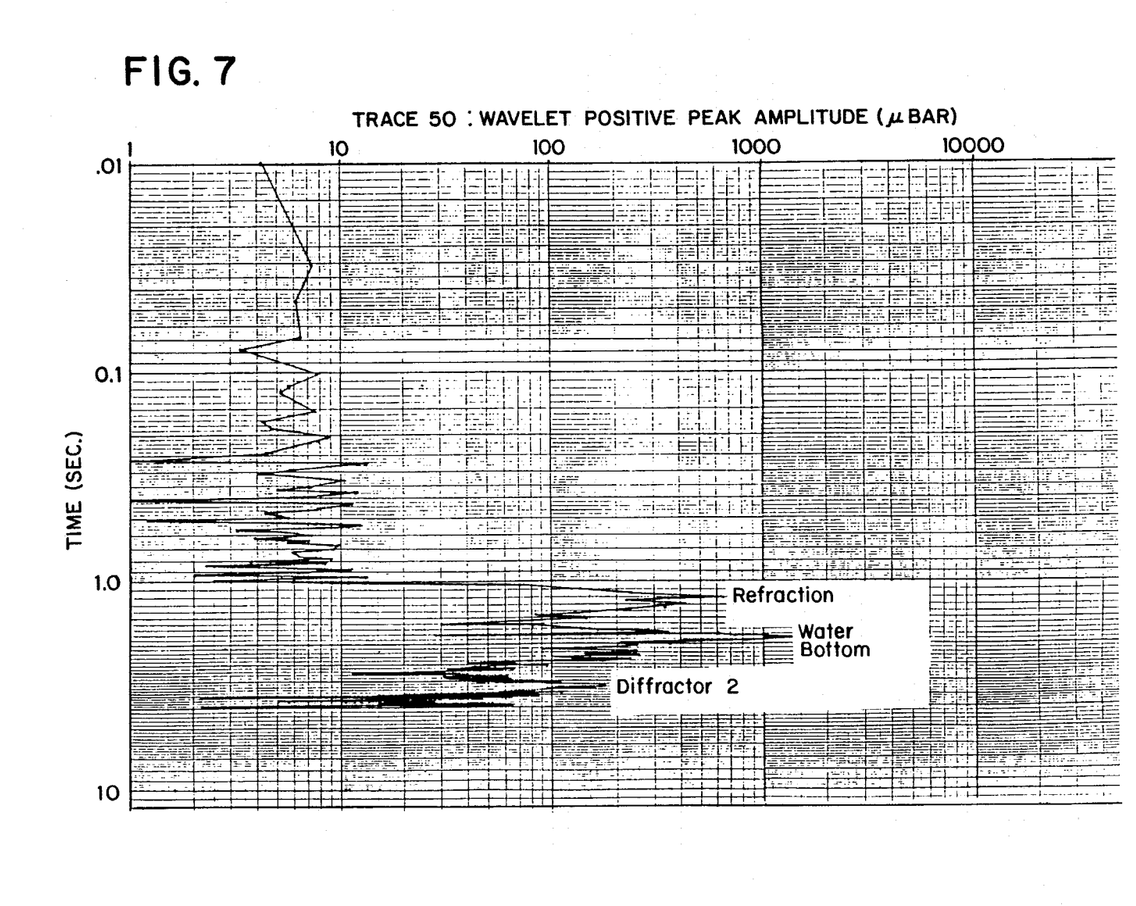
Figure 8:
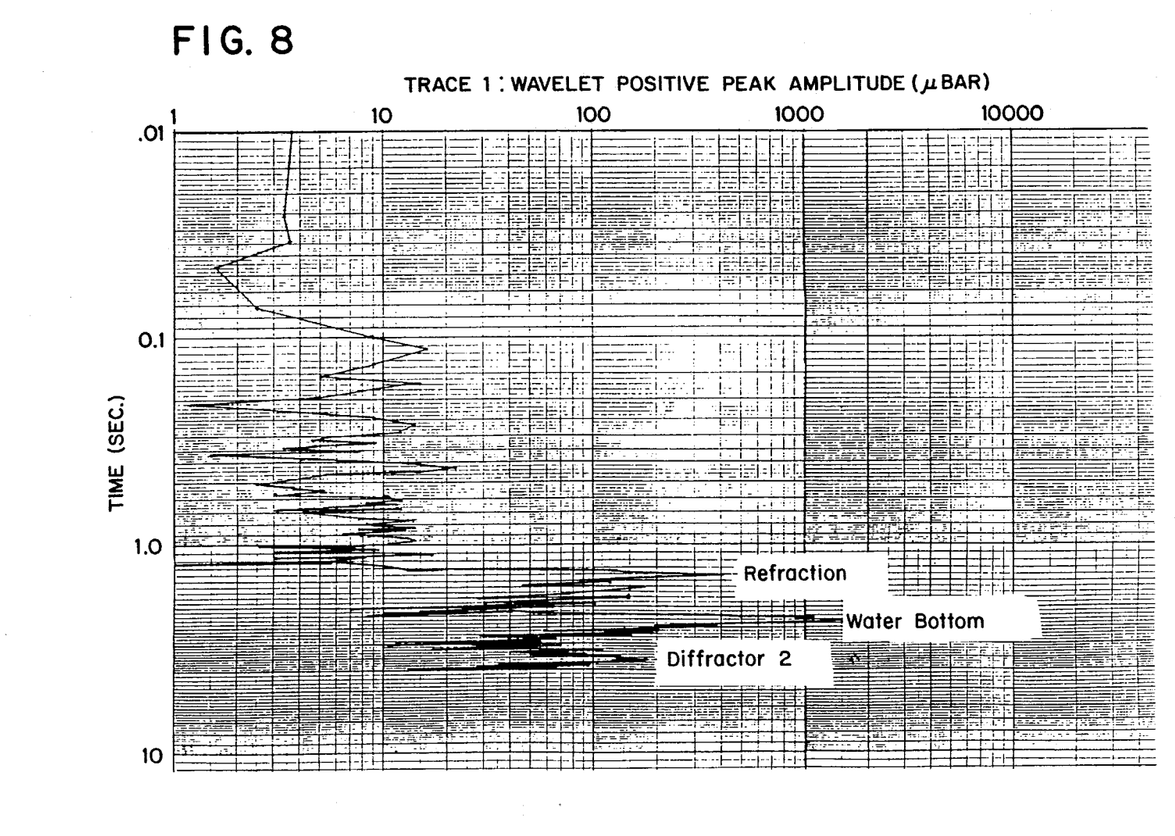

Next, the wavelet plot is carried out at step 35 for each of the selected traces. FIG. 5 illustrates a wavelet plot derived from seismic trace 240 of FIG. 4 recorded by a hydrophone positioned at the end of the receiver array nearest the acoustic energy shot point 720. FIGS. 6 and 7 illustrate wavelet plots derived from seismic traces 150 and 50 recorded by hydrophones intermediate of the ends of the receiver array. FIG. 8 illustrates a wavelet plot derived from seismic trace 1 recorded at the end of the receiver array farthest from the acoustic energy shot point 720. The readily identifiable events, such as reflectors, diffractors, refraction interfaces and water bottom are labeled in FIGS. 4–8. In selecting the seismic traces, such as traces 1, 50, 150 and 240 as in FIGS. 5–9, it should be understood that the selected traces may be the outputs from a single hydrophone receiver or, in the alternative, the outputs of several successively positioned hydrophones combined.

Figure 3:
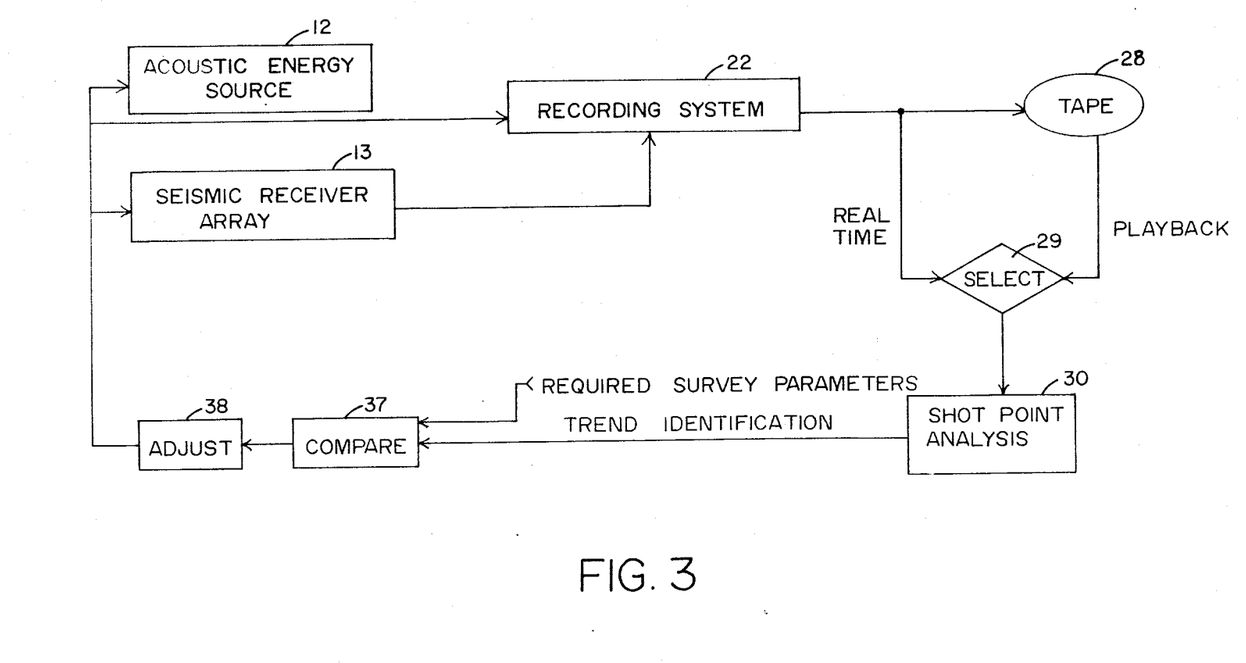
Figure 9:
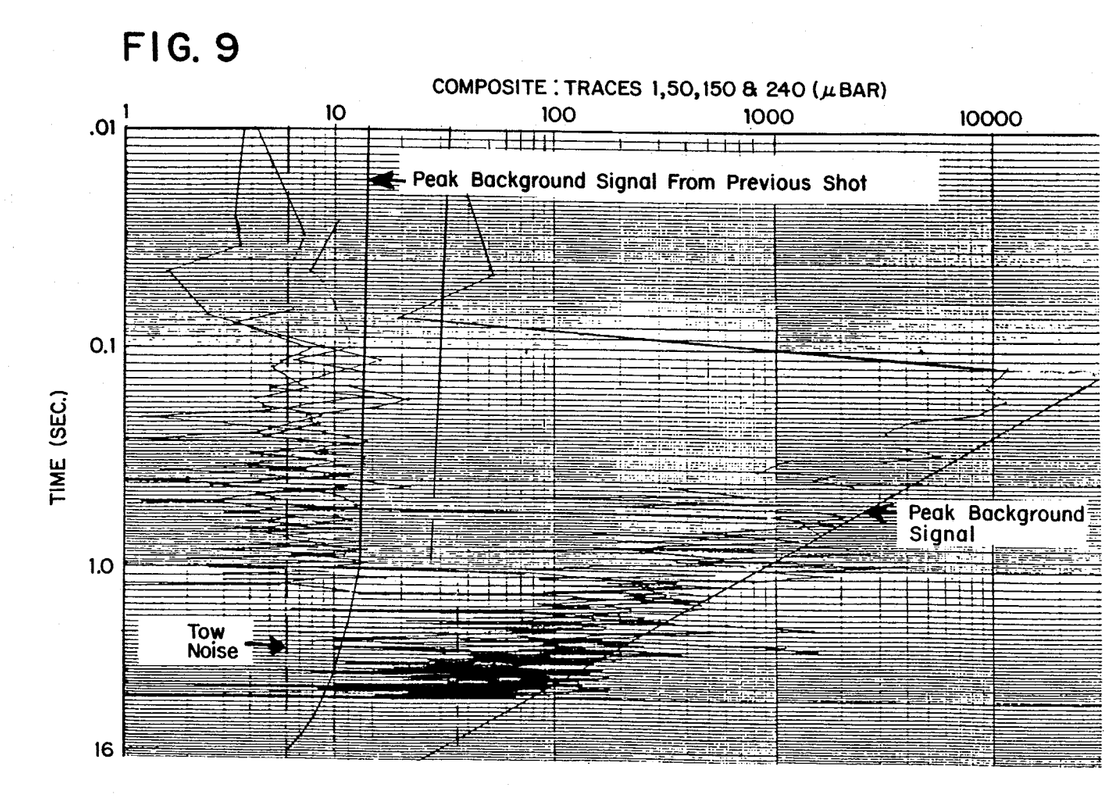

The next step 36, is to identify trends in actual system survey parameters away from required survey parameters. Such identification can be observed from a comparison of the wavelet plots. To enhance such observation, a composite plot of the select wavelets is made as shown in FIG. 9. One such trend in the peak background signal across the receiver array is labeled in FIG. 9. Any trend identification is then compared with required survey parameters at step 37. Correction or adjustment can then be made at step 38 to bring the actual values of the survey parameters back in line with the required values for such survey parameters. This can be more fully understood by referring to FIG. 3 wherein shot point analysis is made at 30 from a selection at 29 of either real-time data during a survey operation or of playback data from tape 28 for designing a future survey operation.

In carrying out the trend identification step 36 on the wavelets plotted in FIGS. 5-9, the following survey parameter trends can be identified. The water bottom reflection is the strongest recorded seismic event and it decreases in amplitude at a slower rate than the remaining prominent recorded events as travel distance increases. The peaks of the decaying background signal from traces 1, 50, 150 and 240 lie on a straight line. The background signal from the previous shot did not decrease to the tow noise level until 16 seconds after the timebreak. Therefore, the tow noise level is the background level from the previous shot. If receiver signal levels are lower than the full scale recording instrument signal levels, then the receiver array sensitivity could be increased to more fully utilize the dynamic range of the recording instruments. The dynamic range of the traces could also be increased by making small signals greater than instrumentation noise. If the shot point interval time were increased, then the peak background signal will reduce toward the peak noise. In this manner, the dynamic range of all traces would be increased. If the time interval between shot points were reduced, the peak background signal from the previous shot point would reduce the dynamic range of all traces.

The seismic survey from which the recordings of FIGS. 5-9 were obtained employed a 3000 cubic inch point source array. The 3000 meter receiver array was employed with 240 receiver channels at 12½ meter group length. The source-to-near trace offset was 178 meters and the shot point interval was 25 meters.

This method of shot point analysis can be utilized on field recorded seismograms anywhere in the world to show the inter-related effects of energy source, receiver array configuration, and instrumentation, for example, on seismic event and noise signals. Recorded amplitude levels on tape resulting from adjustments to the seismic system can be considered that would optimize the system to conditions existing at the time of conducting the survey.

While a preferred embodiment of the method of the present invention has been described and illustrated, numerous modifications or alterations may be made without departing from the spirit and scope of the invention as set forth in the appended claims.

I claim:

1. A method for conducting a marine seismic survey along a line of exploration, comprising the steps of:
    (a) traversing said line of exploration with a seismic survey system having an acoustic energy source, an array of spaced-apart receivers, and a recording system,
    (b) firing said acoustic energy source at a plurality of shot points along said line of exploration.
    (c) recording the seismic reflections signals received by one of said receivers for each of said shot points,
    (d) selecting a common wavelet in said recorded seismic signals of said receiver for each of said shot points,
    (e) measuring the amplitudes of said common wavelet of said receiver over said plurality of shot points, and
    (f) comparing said measured amplitudes to identify a trend from shot point to shot point over said plurality of shot points in an actual value of a seismic survey parameter.

2. The method of claim 1 further comprising the step of adjusting said seismic survey parameter to change said identified trend in said parameter.

3. The method of claim 1 further comprising the step of generating a wavelet of amplitude versus shot point location for said measured amplitudes over' said plurality of shot points.

4. A method for conducting a marine seismic survey along a line of exploration, comprising the steps of:
    (a) traversing said line of exploration with a seismic survey system having an acoustic energy source, an array of spaced-apart receivers, and a recording system,
    (b) firing said acoustic energy source at a plurality of shot points along said line of exploration,
    (c) recording seismic reflection signals received by said array of receivers for each of said shot points,
    (d) selecting a plurality of said recorded seismic reflection signals from one of said receivers over said plurality of shot points.
    (e) identifying a common wavelet in each of said selected plurality of recorded seismic reflection signals of said receiver,
    (f) measuring amplitudes of said common wavelets, and
    (g) comparing said measured amplitudes to identify a trend from shot point to shot point over said plurality of shot points in an actual value of a seismic survey parameter.

5. The method of claim 4 further comprising the step of generating a wavelet plot of amplitude versus time for said wavelets.

6. The method of claim 5 further comprising the step of generating a composite plot of said selected wavelets with the amplitude axis determined by the maximum peak amplitude of said selected wavelets.

7. The method of claim 4 further comprising the step of adjusting said seismic survey parameter to change said identified trend in said parameter.

8. The method of claim 4 further comprising the steps of selecting recorded seismic reflection signals from at least three of said spaced-apart receivers over said plurality of shot points comprising the nearest and farthest receivers from a seismic energy shot point and at least one intermediate receiver between said nearest and farthest receivers and repeating steps (e)-(g) for each of said receivers.

9. The method of claim 4 further comprising the steps of selecting recorded seismic reflection signals from at least three of said spaced-apart receivers over said plurality of shot points comprising a first receiver located within a first grouping of said receivers positioned nearest said seismic energy shot point, a second receiver located within a second grouping of said receivers positioned farthest from said seismic energy shot point, and a third receiver located within a third grouping of said receivers positioned between said first and second groupings and repeating steps (e)-(g) for each of said receivers.

* * * * *